(12) United States Patent
Roslak et al.

(10) Patent No.: US 8,242,932 B2
(45) Date of Patent: Aug. 14, 2012

(54) REMOTE SENSING SYSTEM (75) Inventors: Thomas Roslak, Northport, NY (US);
Andrew Doorty, Northport, NY (US);
Luis Llamas Martinez Garza,
Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 484 days.

(21) Appl. No.: 12/624,611

(22) Filed: Nov. 24, 2009

(65) Prior Publication Data
US 2011/0121989 A1 May 26, 2011

(51) Int. Cl.
*G08C 15/06* (2006.01)
(52) U.S. Cl. .................. 340/870.02; 382/182; 382/284; 382/287; 382/260; 382/151; 348/262; 348/263; 348/264; 348/265; 348/144; 340/688; 356/606; 356/613; 356/615
(58) Field of Classification Search ............. 340/870.02, 340/688; 382/151, 199, 182, 202, 260, 284, 382/287; 348/144, 262–265, 135, 160; 356/606, 356/613, 615
See application file for complete search history.

(56) References Cited

U.S. PATENT DOCUMENTS

| | | | | |
|---|---|---|---|---|
| 4,680,704 A | * | 7/1987 | Konicek et al. | 340/870.02 |
| 4,811,011 A | * | 3/1989 | Sollinger | 340/870.02 |
| 5,160,926 A | * | 11/1992 | Schweitzer, III | 340/870.02 |
| 5,870,140 A | * | 2/1999 | Gillberry | 340/870.02 |
| 6,208,266 B1 | * | 3/2001 | Lyons et al. | 340/870.02 |
| 6,845,177 B2 | * | 1/2005 | Chiu | 340/870.02 |
| 7,019,777 B2 | * | 3/2006 | Sun | 348/263 |
| 8,144,027 B2 | * | 3/2012 | Goldberg et al. | 340/870.02 |
| 2007/0171092 A1 | * | 7/2007 | Allgood | 340/870.02 |
| 2011/0154911 A1 | * | 6/2011 | Ge | 73/861.11 |

OTHER PUBLICATIONS

"Monitor Your Home Power Usage—Easily," accessed at http://www.bluelineinnovations.com/default.asp?mn=1.274.285.388.393, pp. 2, accessed on Jun. 18, 2012.

* cited by examiner

*Primary Examiner* — Lam T Mai (57) ABSTRACT

An imaging system (10) and method (200) for reading residential and/or commercial meters. The system and method comprise a transmission element (12) that attaches to an external location of a meter (24). The transmission element (12) selectively communicates a reading signal (40) corresponding to a meter value. The system and method further comprise an imaging unit (14) located within the transmission element (12) that images the meter value at a prescribed frequency. The system and method also comprise a transceiving arrangement (16) that receives the reading signal (40) communication from the transmission element. The transceiving arrangement (16) also comprises a converter (44) that analyzes and converts the reading signal (40) communication to a use signal (46).

20 Claims, 6 Drawing Sheets

FIG. 9

# REMOTE SENSING SYSTEM

TECHNICAL FIELD

The present disclosure relates to remote sensing systems and more particularly, remote sensing systems for reading utility meters associated with commercial and/or residential establishments and transmitting the read information to desired locations.

BACKGROUND

Traditionally, utility meters such as water, gas, and electric are located on or near the residential or commercial building using the utility service. The meters are frequently monitored by employees of the utility companies that travel from building-to-building or home-to-home, logging or confirming the meter values for billing purposes. This manual approach to reviewing the utility meters is time consuming, costly, and labor intensive.

The utility meters described above typically comprise a series of dials and/or numerical values. To the owners of the establishments, such dials and numbers offer no assistance in discerning ones real time utility costs or costs over a given period of time (running costs). Generally, real time utility costs or running costs can be calculated if a difference is known between the meter start value and current value and this difference is multiplied by the utility rate at the present time or over the period of time to be calculated. Accordingly, it should be appreciated that conventional utility meters do not provide a user-friendly method to the owners of the establishment to calculate their consumption costs and often have to rely on the utility companies' monthly invoice or bill.

SUMMARY

One example embodiment of the present disclosure includes an imaging system for reading residential and/or commercial utility meters. The imaging system comprises a transmission element that attaches to an external location of a utility meter. The transmission element selectively communicates a reading signal corresponding to a utility meter value. The imaging system further comprises an imaging unit located within the transmission element that images the utility meter value at a prescribed frequency. The imaging system also comprises a transceiving arrangement that receives the reading signal communication from the transmission element. The transceiving arrangement further includes a converter that analyzes and converts the reading signal communication.

Another example embodiment of the present disclosure comprises a method of imaging and transmitting an image captured from residential and/or commercial utility meters. The method comprises attaching a transmission element to an external location of a utility meter and imaging at a prescribed frequency a utility meter value on the utility meter with an imaging unit. The imaging unit is fixedly attached to the transmission element. The method further comprises communicating from the transmission element a reading signal corresponding to the image utility meter value captured by the imaging unit and receiving the reading signal sent from the transmission element with a transceiving arrangement. The method also comprises converting said reading signal communication with a converter located within said transceiving arrangement to a use signal comprising a use value and transmitting the use signal to at least one monitoring system in remote communication with the transceiving arrangement. The monitoring system receives the use signal that includes the use value that is displayed on the monitoring system.

Yet another example embodiment of the present disclosure comprises an imaging system for reading residential and/or commercial utility meters. The imaging system comprises a transmission element that attaches to an external location of a utility meter. The transmission element selectively communicates a reading signal corresponding to a utility meter value. The transmission element comprises, an antenna for transmitting the reading signal using a wireless communication protocol, a plurality of solar cells providing a source of power to the transmission element, and an imaging unit located within the transmission element that images the utility meter value at a prescribed frequency. The imaging system further comprises a transceiving arrangement that receives the reading signal communication from the transmission element. The transceiving arrangement includes converter that analyzes and converts the reading signal communication to a use signal comprising a use value. The imaging system also includes at least one monitoring system in remote communication with the transceiving arrangement, the monitoring system receiving a use signal that includes a use value displayed on the monitoring system.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

The present disclosure relates to remote sensing systems and more particularly, remote sensing systems capable of reading utility meters associated with commercial and/or residential establishments and transmitting the read information to desired locations. The remote sensing system of the present disclosure images the meter reading without interfering with the meter's installation. The remote sensing system of the present disclosure further provides meter collection data without labor-intensive human interaction and typical transcription or reading errors associated therewith.

Figure 1:
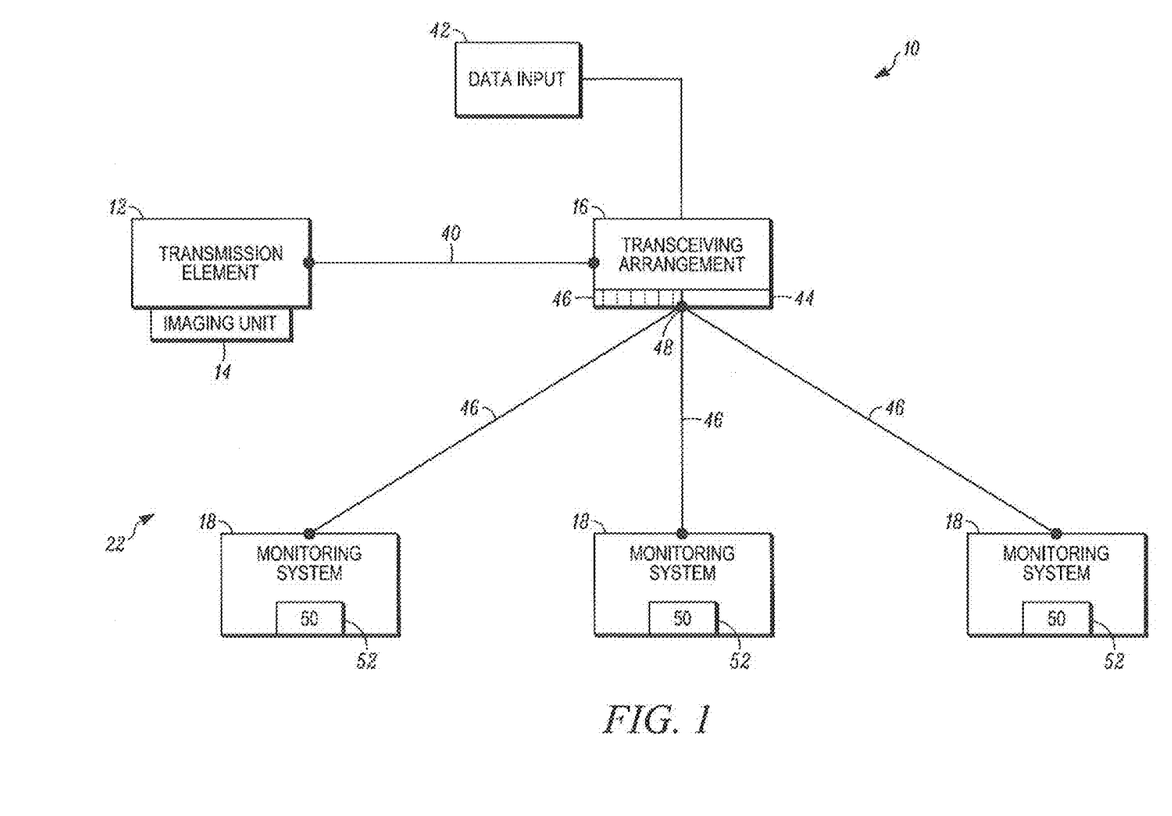
FIG. 1 is a block diagram of an imaging system constructed in accordance with one example embodiment of the present disclosure.
Figure 2:
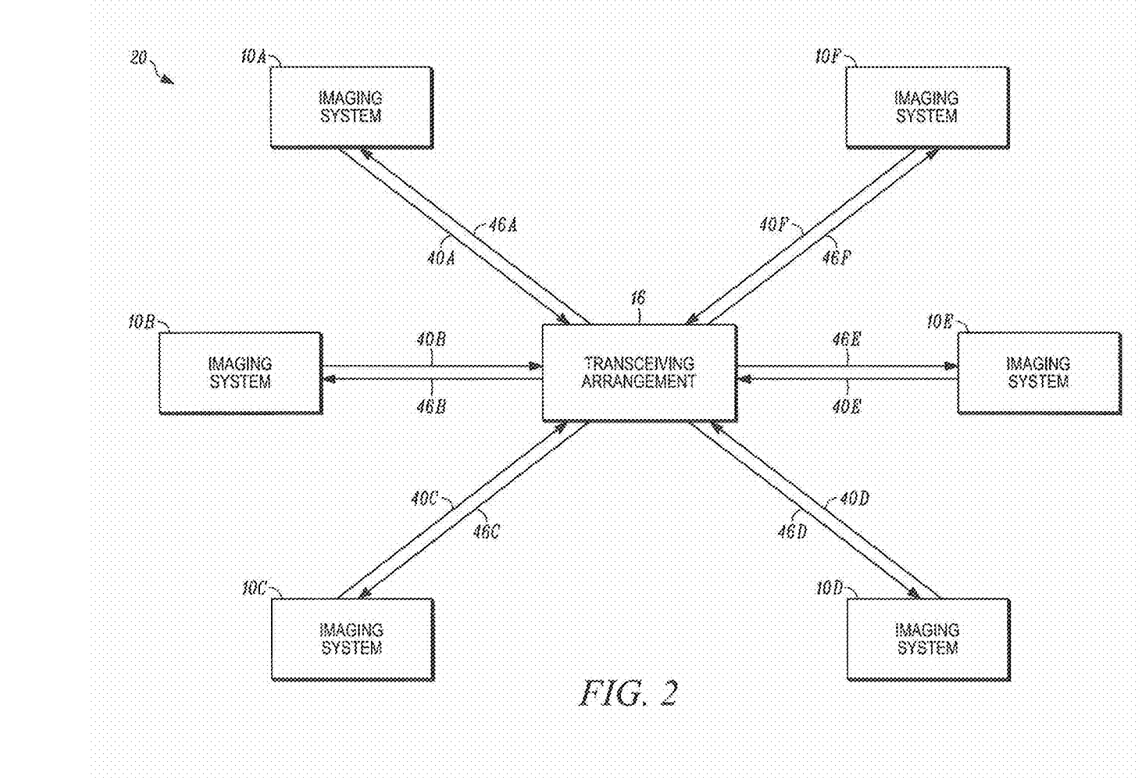
FIG. 2 is a block diagram of an imaging system constructed in accordance with another example embodiment of the present disclosure.

Generally, a remote sensing imaging system 10 is schematically illustrated in FIG. 1 constructed in accordance with one embodiment of the present disclosure. The remote sensing imaging system 10 provides a low cost device that can read existing meters on demand and non-invasively in a self-sufficient manner as further described below. In particular, the imaging system 10 comprises a transmission element 12 having an imaging unit 14, a transceiving arrangement 16, and one or more monitoring systems 18. The imaging system 10 allows for polling or transmitting of data autonomously from/to a central or distributed system. In particular, the transceiving arrangement 16 can be centrally located for several or all imaging systems 10 with a centralized system 20 illustrated in one example embodiment of FIG. 2 and a second example embodiment indicated by the prime reference characters in FIG. 3. The centralized system 20 uses a single transceiving arrangement 16 for several different imaging systems 10 that, for example, could be located at the utility or private service company. Alternatively, a distributed system 22 (shown in FIG. 1) has a dedicated transceiving arrangement 16 for each imaging system 10, and is in communication (either wired or wireless mode) with the utility or private service company.

Figure 3:
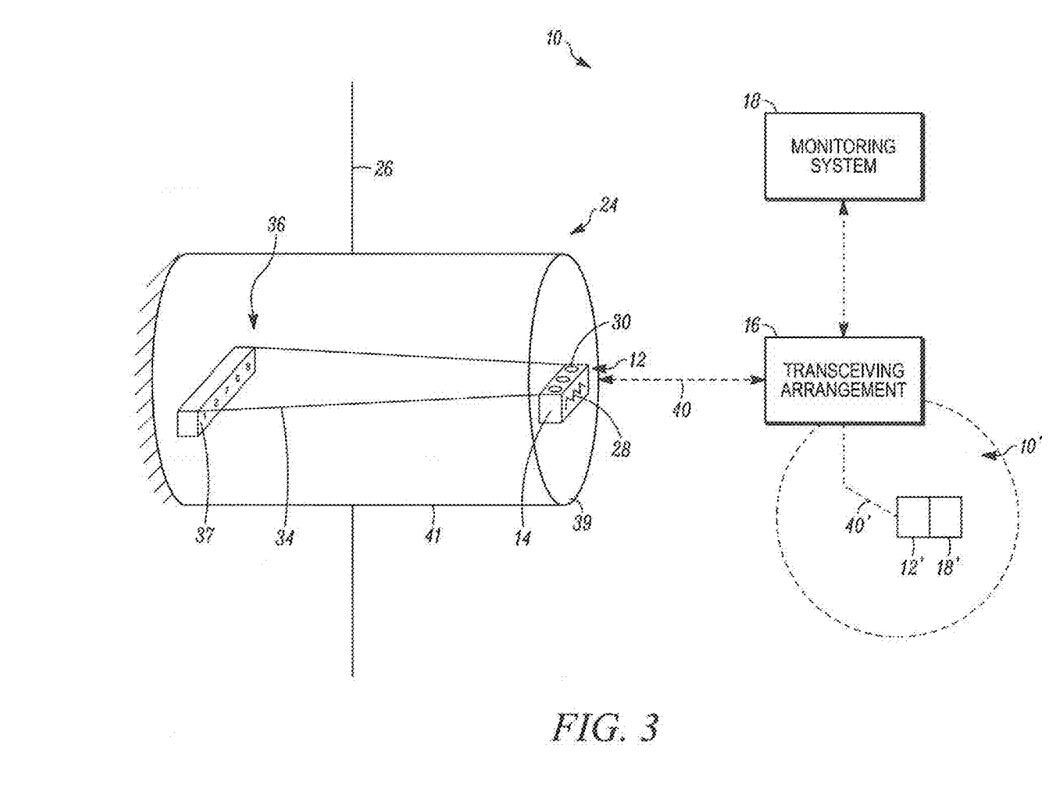
FIG. 3 is a perspective schematic of an imaging system constructed in accordance with another example embodiment of the present disclosure.

Referring now to FIG. 3 is a physical example embodiment of an imaging system 10 constructed in accordance with one embodiment of the present disclosure. Specifically, a transmission element 12 is fixedly attached to a utility meter 24 located on an exterior wall to a residential or commercial establishment, such as a house, building, apartment, store, plant, and the like (hereinafter collectively "establishment 26"). The transmission element could equally be fixedly attached to a utility meter 24 located on an interior wall of an establishment 26 without departing from the spirit or scope of the claimed invention.

The utility meter 24 could be any number of meters from any number of utility companies, including for example, gas, water electric, cable, and the like, as well as any meter used by a private company to track consumption of a particular good or service at the establishment 26. In the illustrated embodiment of FIG. 3, the transmission element 12 comprises in addition to the imaging unit 14, an antenna 28, and solar cells 30 for providing power to the transmission element. In one example embodiment, the antenna 28 is a wireless or wide area network "WAN" antenna or WAN modem capable of receiving or transmitting data. One example of a suitable modem includes an Israel Codex Fast 3266 modem manufactured by Motorola. The data and specification sheets for the Codex Fast modem are incorporated herein by reference.

Figure 4:
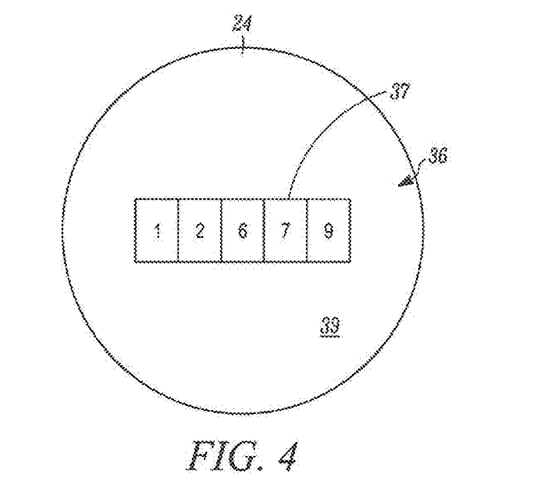
FIG. 4 is a front elevation view of a utility meter.

The imaging unit 14 is electronically coupled to the transmission element 12 via a printed circuit board "PCB" or through analog and/or digital circuitry. The imaging unit or camera 14 includes a field-of-view 34 (see FIG. 3) about a target object or indicia 36 to be imaged by the camera. In the illustrated example embodiment of FIG. 3, the target object 36 is a series of numerical digits or reading value 37 that change as the goods or services measured by the meter are consumed by the establishment 26. The reading value 37 can also be a plurality of dials and seen through a transparent faceplate 39 in the meter 24 as shown without the transmission element in FIG. 4. The meter 24 further comprises a housing 41, typically cylindrical that is attached to the wall of the establishment 26.

Figure 6:
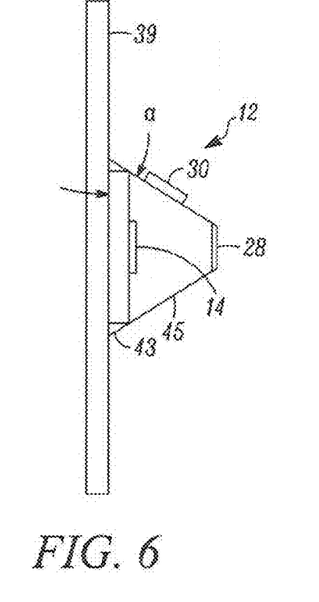
FIG. 6 is a side elevation view of a transmission element attached to a face of a meter in accordance with one example embodiment of the present disclosure.
Figure 7:
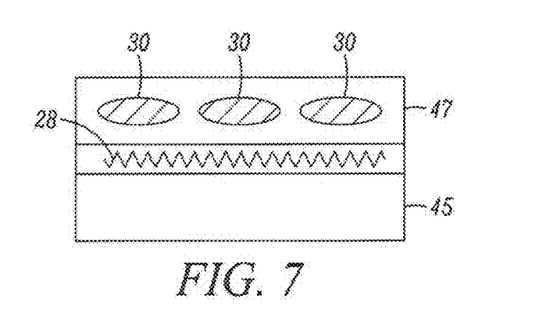
FIG. 7 is a front elevation view of a transmission element constructed in accordance with one example embodiment of the present disclosure.
Figure 8:
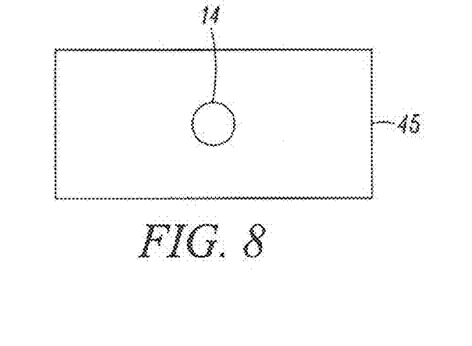
FIG. 8 is a rear elevation view of a transmission element constructed in accordance with one example embodiment of the present disclosure.

Further details of the transmission element 12 and its attachment to the meter 24 are further illustrated in FIGS. 6-8. In particular, the transmission element 12 includes a body 45 that is attached to the face 39 of the meter 24 as best seen in the partial side-elevation view of FIG. 6. In the illustrated embodiment, the body 45 is fabricated from plastic and secured to the face 39 by an index matching adhesive 43 to allow the camera 14 to image the target object 36 with minimal distortion. In an alternative embodiment, the body 45 is secured to the face 39 by using a template for locating the position of the transmission element 12 relative to the target object 36 within the meter 24. In another embodiment, the body 45 is secured to the meter 24 housing 41 with conventional fasteners. Front and rear views of the transmission element 12 are further shown in FIGS. 7 and 8.

Figure 5:
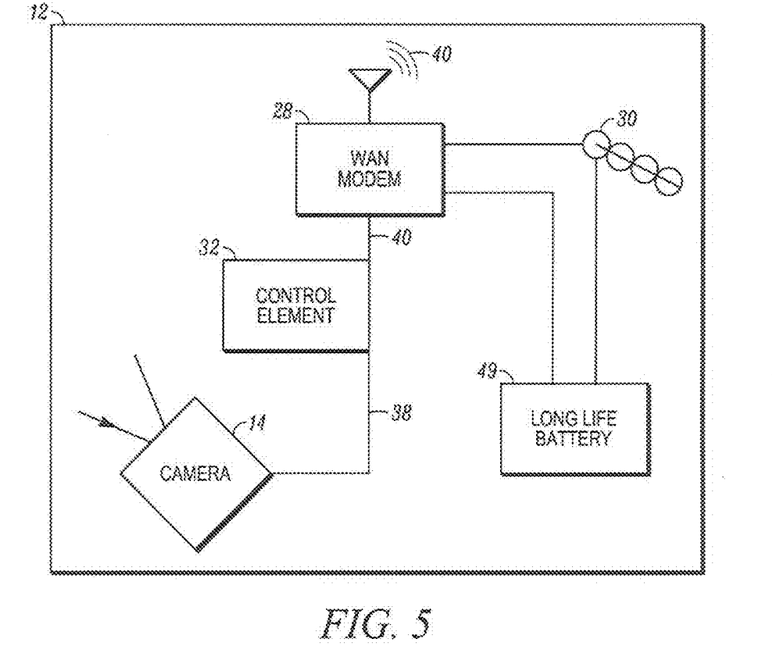
FIG. 5 is a schematic diagram of a transmission element constructed in accordance with one example embodiment of the present disclosure.

The solar panels 30 are located on a surface 47 of the body 45 at an angle $\alpha$ of approximately 45 degrees (see FIG. 6) for capturing light to power the transmission element 12. Additional power is provided to the transmission element 12 through a long life-battery 49 (see FIG. 5) in applications where light for the solar panel is limited.

The imaging unit 14 comprises an imaging camera capable of imaging both 1D and 2D indicia. In addition to imaging 1D and 2D indicia, the imaging unit 14 is also capable of capturing soft images, barcodes, soft signature imaging acquisition and identification systems, soft optical character recognition systems, soft fingerprint identification systems, and the like.

The imaging unit 14 in one embodiment comprises a conventional scan engine 32 that is programmable, allowing for a prescribed frequency of the camera 14 imaging or upon demand by a signal sent from the transceiver 16 to the transmission element 12. The scan engine or control element 32 coupled to the camera 14 (as further illustrated in the schematic of FIG. 5) comprises a conventional scanning assembly, having CCD or CMOS imaging configuration. The scan engine's 32 imaging configuration typically comprises a plurality of photosensitive elements (photosensors) or pixels typically aligned in an array pattern that could include a number of arrays. Light reflected from a target indicia 36 (see FIG. 3) is focused through a focusing lens internal to the scan engine's imaging unit 14 or camera onto an internal pixel array (not shown). The focusing lens as a result, generates an image from its field-of-view 34 that is projected onto the pixel array. Periodically, the pixels of the array of the imaging unit or camera 14 are sequentially read-out, creating an analog signal 38 (see FIG. 5) representative of a captured image frame. In an alternative example embodiment, the imaging unit or camera 14 is read-out in parallel or a registered format.

The analog signal 38 is amplified by a gain factor, by for example, an operational amplifier or microprocessor that can be either internal or external to the scan engine 32. The amplified analog signal 38 is digitized by an analog-to-digital ("A/D") converter. Decoding circuitry and the A/D converter can also be internal or external to the scan engine 32, accordingly process the digitized signals representative of the captured image frame, and attempt to decode the imaged target object into a reading signal 40. The reading signal 40 is representative of the image of the target object 36 and communicated to, and transmitted from the antenna 28 to the transceiving arrangement 16 by the transmission element 12 via a wireless protocol frequency, such as a Wi-Fi, Zigbee, or other known radio frequencies. The scan engine 32 not only controls the frequency in which the imaging occurs, but also controls the frequency in which the reading signal is transmitted. In particular, the transmitting element 12 can be activated by the scan engine 32 at different times to coincide with predicted periods of low communications channel usage. In an alternative example embodiment, the transmission element 12 is activated to image and transmit the reading signal 40 upon demand based on a signal sent to the transmission element from the transceiving arrangement 16 and/or monitoring system 18.

The transceiving arrangement 16 further includes an input data aggregate 42 that comprises compiled information relating to usage rate values, for example, correlated to a price usage of a particular good or service consumed at the establishment 26. For example, one input 42 includes the U.S. currency cost for one-kilowatt hour of power. Another input 42 example includes the U.S. currency cost for a prescribed number of cubic feet of natural gas. The input data aggregate 42 can vary (for example by market price) and is programmed into a converter or processor 44 located within the transceiving arrangement 16 that converts the reading signal 40 into a use signal 50. This conversion is achieved by programming the converter 44 to multiply the reading signal 40 by the corresponding data aggregate 42 to provide a use signal 46 that is transferred via an antenna 48 to any number of monitoring systems 18 as illustrated in FIG. 1. The use signals 46 comprise a use value 50 computed by the processor 44, indicating the price for the usage of a particular good or service consumed at the establishment 26. The use value 50 comprises both real time costs of usage as well as a total usage costs over a prescribed period of time programmed in the processor 44 of the transceiving arrangement 16. For example, the use value 50 can include a real time electric use rate costs for all appliances that are currently operating at the establishment 26 as well as a total cost and kilowatt usage amount for a period over a number of days, months, years, etc. In one example embodiment, the data aggregate 42 is received and transmitted to any combination of the transmission element 12 and/or transceiving arrangement 16 and/or monitoring system 18.

In an alternative example embodiment, the use value 50 is accessed remotely via the internet. In yet another example embodiment, the utility company or private service/good seller provides use and supply demand cost schedules. For example, during peak usage periods of the goods or services being monitored, the utilities or providers could offer consumers heavy discounts or credits for reducing usage of the goods or services. A communication could be sent from the utility company or service/good provider to the consumer via their systems management server ("SMS") to their cell phone, home computer, or monitoring system 18.

The monitoring system 18 comprises a display 52 that includes real-time usage rates and running total usage rates over a prescribed period of time collectively "the use value 50". The monitoring system 18 can be a portable hand-held display or a personal computer, both of which are capable of receiving the use signal 46 containing the use value 50 via a wired or wireless connection. In one example embodiment, several monitoring systems 18 receiving the same use signal 46 and value 50 are used with a single imaging system 10. For example, one monitoring system 18 could be used by the owner of the establishment 26, a second by a utility company, and a third system 18 may be desirable to a third party for monitoring the establishment's consumption. The transceiving arrangement 16 in the centralized system 20 can transmit specific use signals 46 to specific imaging systems 10 based on the respective reading signal 40 (see FIG. 2).

In yet another example embodiment, the analog signal 38 is transmitted from the transmission element 12 and decoded and amplified by a scan engine 32 located within the transceiving arrangement 16. The scan engine 32 decodes the analog signal 38 such that the processor 44 in the transceiving arrangement 16 converts it to the reading signal 40.

Figure 9:
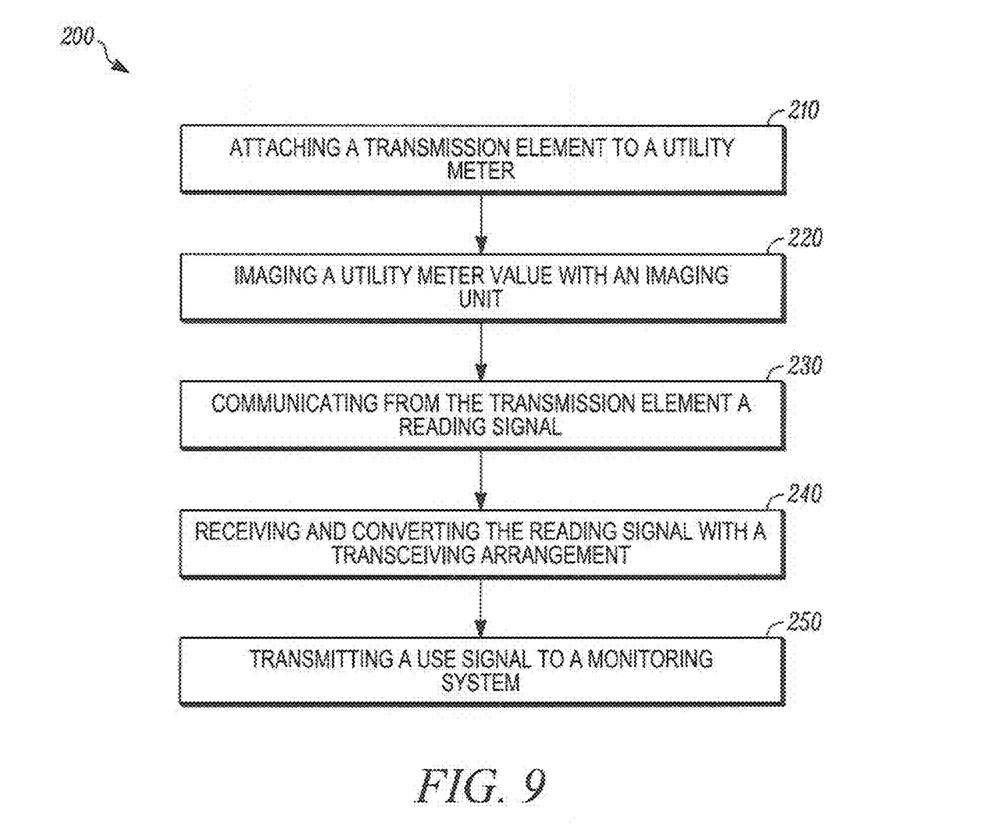
FIG. 9 illustrates a method 200 of imaging and transmitting an image captured from residential and/or commercial utility meters in accordance with one example embodiment of the present disclosure.

Referring now to FIG. 9 is a method 200 of imaging and transmitting an image captured from residential and/or commercial utility meters in accordance with one example embodiment of the present disclosure. At 210, the method 200 comprises attaching a transmission element to a utility meter. At 220, the method 200 comprises imaging a utility meter value with an imaging unit. At 230, the method 200 comprises communicating from the transmission element a reading signal. At 240, the method 200 comprises receiving and converting the reading signal with a transceiving arrangement. At 250, the method 200 comprises transmitting a use signal to a monitoring system.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An imaging system for reading residential and/or commercial meters, the imaging system comprising:
   a transmission element that attaches to an external location of a meter, the transmission element selectively communicating a reading signal corresponding to a meter value;
   an imaging unit located within said transmission element that images the meter value at a prescribed frequency; and
   a transceiving arrangement that receives the reading signal communication from said transmission element, the transceiving arrangement further comprising a converter that analyzes and converts the reading signal communication to a use signal.

2. The imaging system of claim 1 wherein said transceiving arrangement converter employs optical character recognition for converting the reading signal communication.

3. The imaging system of claim 1 further comprising at least one monitoring system in remote communication with said transceiving arrangement, said monitoring system receiving a use signal that includes a use value displayed on said monitoring system.

4. The imaging system of claim 1 wherein said transceiving arrangement is remotely located from said transmission element.

5. The imaging system of claim 3 wherein said monitoring system is remotely located from said transceiving arrangement.

6. The imaging system of claim 1 wherein said transmission element further comprises a WAN antenna for selectively communicating a reading signal corresponding to a meter value to said transceiving arrangement.

7. The imaging system of claim 6 wherein said transmission element further comprises a solar panel comprising a plurality of solar cells coupled to a power storage source that collectively power said transmission element.

8. The imaging system of claim 1 wherein said communicating a reading signal corresponding to a meter value is transmitted from said transmission element by a wireless communication protocol.

9. The imaging system of claim 1 wherein said communicating a reading signal corresponding to a meter value is transmitted from said transmission element by a modem.

10. A method of imaging and transmitting an image captured from residential and/or commercial utility meters, the method comprising:
 attaching a transmission element to an external location of a utility meter;
 imaging at a prescribed frequency a utility meter value on the utility meter with an imaging unit, the imaging unit being fixedly attached to said transmission element;
 communicating from the transmission element a reading signal corresponding to the image utility meter value captured by said imaging unit;
 receiving said reading signal sent from the transmission element with a transceiving arrangement;
 converting said reading signal communication with a converter located within said transceiving arrangement to a use signal comprising a use value; and
 transmitting said use signal to at least one monitoring system in remote communication with said transceiving arrangement, said monitoring system receiving said use signal that includes said use value displayed on said monitoring system.

11. The method of claim 10 further comprising remotely locating said transceiving arrangement from said monitoring system.

12. The method of claim 11 further comprising remotely locating said transmission element from said transceiving arrangement.

13. The method of claim 11 further comprising powering said transmission element with one of a plurality of solar cells, a battery, and a super capacitor.

14. The method of claim 11 further comprising transmitting said use signal and reading signal via a wireless communication protocol.

15. An imaging system for reading residential and/or commercial utility meters, the imaging system comprising:
 a transmission element that attaches to an external location of a utility meter, the transmission element selectively communicating a reading signal corresponding to a utility meter value, the transmission element comprising:
  an antenna for transmitting said reading signal using a wireless communication protocol;
  a plurality of solar cells providing a source of power to said transmission element; and
  an imaging unit located within said transmission element that images the utility meter value at a prescribed frequency;
 a transceiving arrangement that receives the reading signal communication from said transmission element, the transceiving arrangement further comprising a converter that analyzes and converts the reading signal communication to a use signal comprising a use value; and
 at least one monitoring system in remote communication with said transceiving arrangement, said monitoring system receiving said use signal that includes said use value displayed on said monitoring system.

16. The imaging system of claim 15 wherein said transceiving arrangement converter employs optical character recognition for decoding the reading signal communication.

17. The imaging system of claim 15 herein said transceiving arrangement is remotely located from said transmission element.

18. The imaging system of claim 15 herein said monitoring system is remotely located from said transceiving arrangement.

19. The imaging system of claim 15 wherein said communicating a reading signal corresponding to a utility meter value is transmitted from said transmission element by a wireless communication protocol.

20. The imaging system of claim 15 wherein said communicating a reading signal corresponding to a utility meter value is transmitted from said transmission element by a modem.

* * * * *

UNITED STATES PATENT AND TRADEMARK OFFICE
CERTIFICATE OF CORRECTION

PATENT NO. : 8,242,932 B2
APPLICATION NO. : 12/624611
DATED : August 14, 2012
INVENTOR(S) : Roslak et al.

Page 1 of 1

It is certified that error appears in the above-identified patent and that said Letters Patent is hereby corrected as shown below:

In Column 8, Line 22, in Claim 17, delete "herein" and insert -- wherein --, therefor.

In Column 8, Line 25, in Claim 18, delete "herein" and insert -- wherein --, therefor.

Signed and Sealed this
Eighth Day of January, 2013

David J. Kappos
*Director of the United States Patent and Trademark Office*